United States Patent Office 2,897,813
Patented Aug. 4, 1959

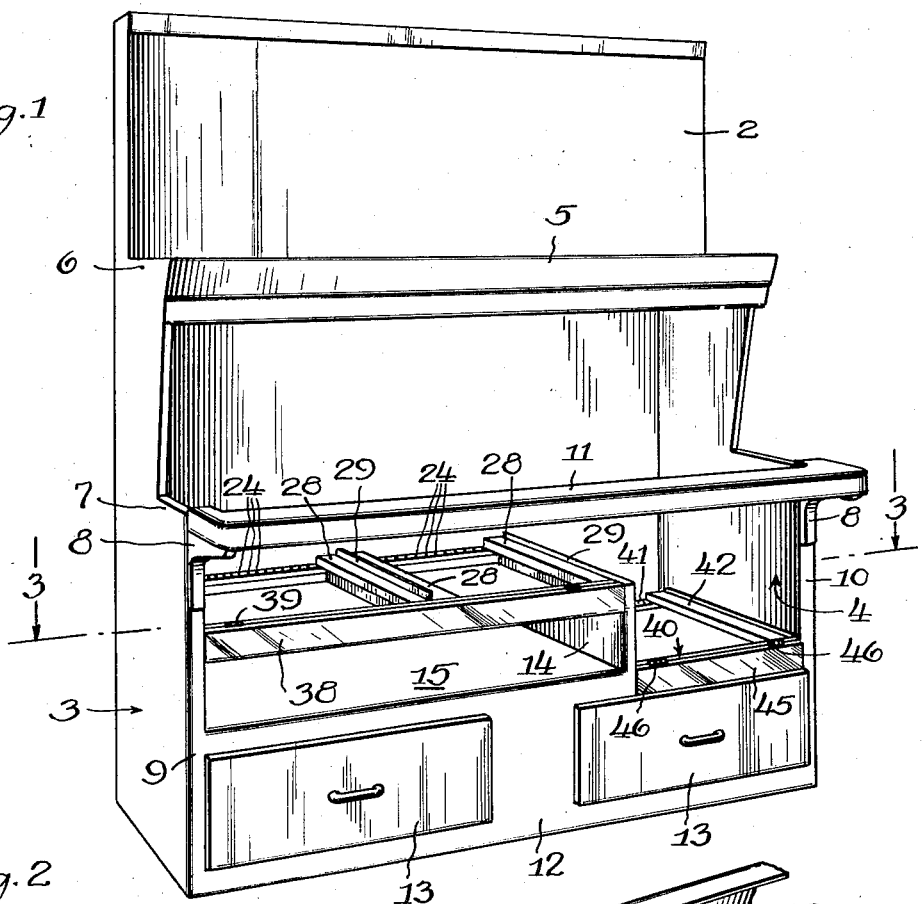
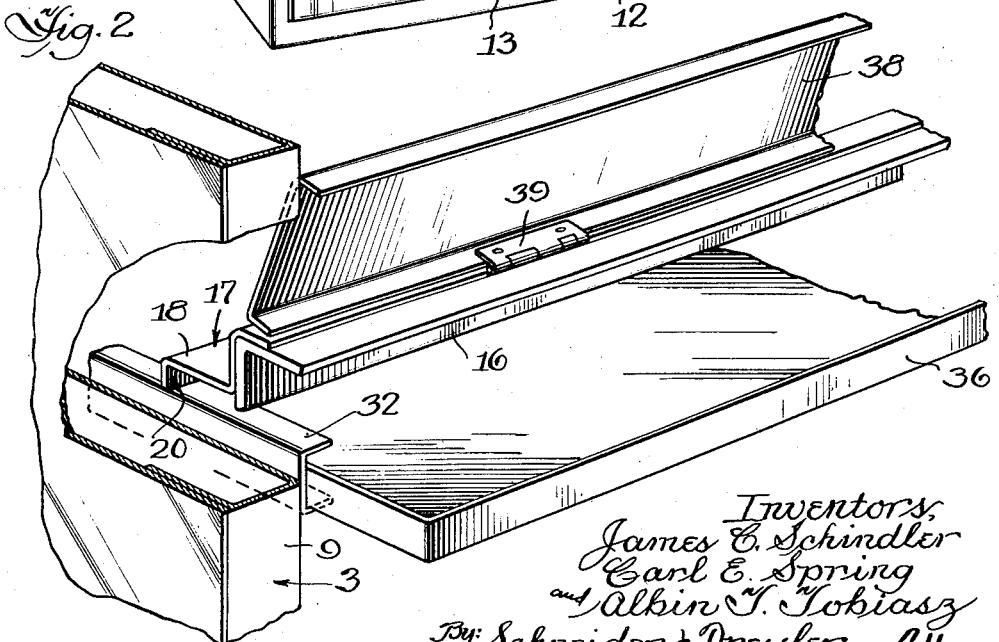

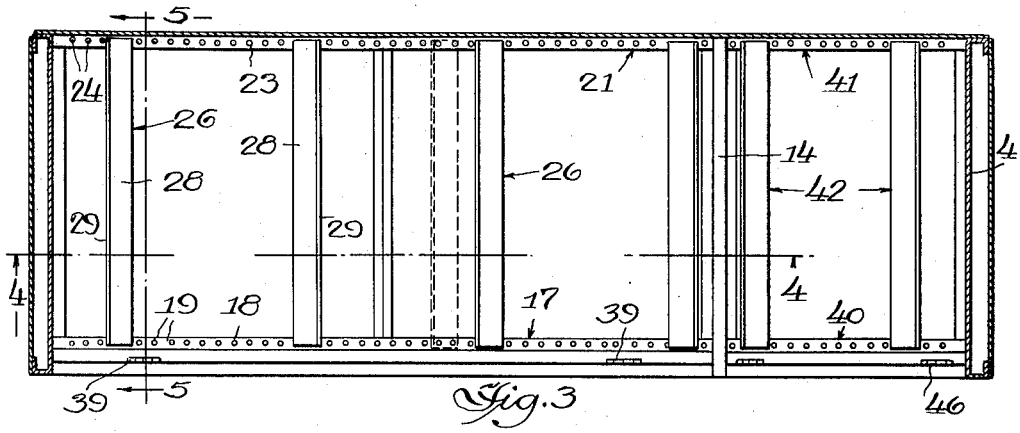
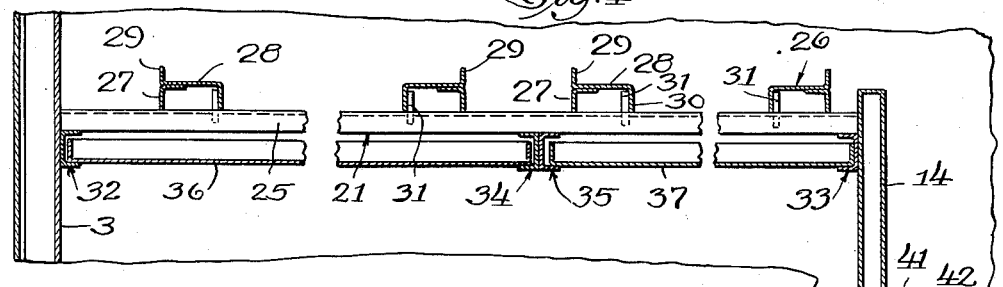
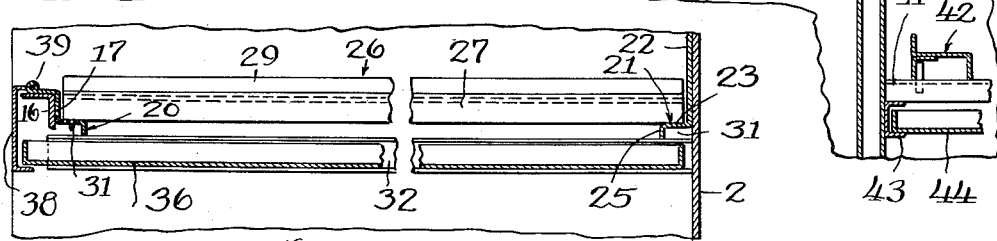
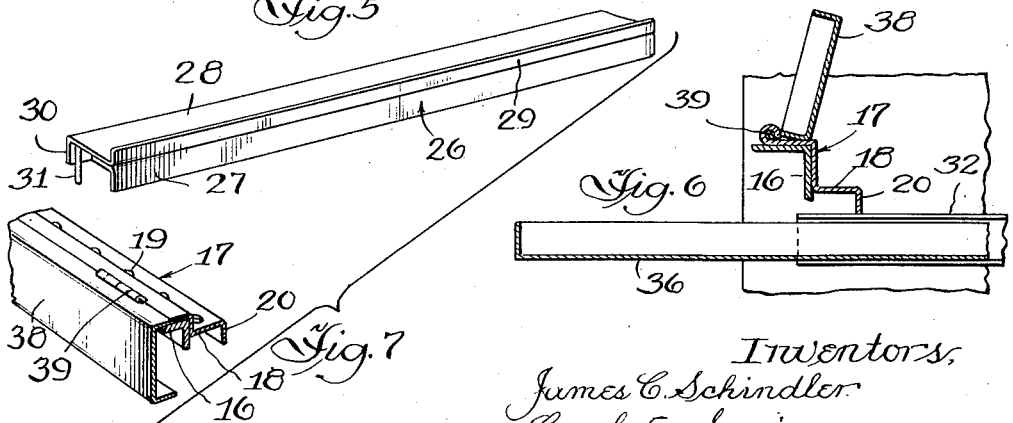
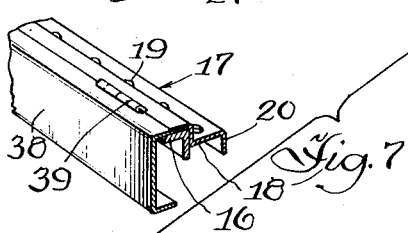

2,897,813
FOOD SERVICE EQUIPMENT UNIT

James C. Schindler, Berwyn, Carl E. Spring, Worth, and Albin T. Tobiasz, Norwood Park, Ill., assignors to Leitner Equipment Company, a corporation of Illinois Application January 8, 1953, Serial No. 330,336

1 Claim. (Cl. 126—39)

This invention relates to a food service equipment unit for use in restaurants or similar establishments having open kitchens, and is particularly concerned with a unit comprising a plurality of different types of cooking equipment combined in a single structure presenting a neat, attractive appearance.

The unit comprising the present invention increases the efficiency of food preparation in restaurants because it enables the cook to simultaneously prepare food in several different manners without requiring excessive walking from one unit to another. The unit is provided with adjustable base supporting rails, so that burner assemblies of different sizes may be positioned in the unit in any desired relationship, and other types of cooking equipment, such as deep fat fryers, broilers, griddles, and steam tables may be selectively positioned in the same unit, up to the total horizontal cross sectional area of the particular unit.

The units of the present invention are basically more or less the same, although the overall size may differ, and the different types of cooking equipment for preparation of food are positioned in the unit. This may be done by the purchaser or by the manufacturer in accordance with the desires of the purchaser. This standardization of the basic portion of the complete unit reduces the manufacturing cost of the units considerably because it enables the manufacturer to concentrate on volume production without carrying an excessive inventory of component parts.

After the unit has been placed in service the arrangement of the cooking equipment may be changed in the event that the original arrangement is not satisfactory. Whenever any portion of the food cooking equipment becomes unserviceable for any reason, it may be removed and replaced with similar equipment or with other types of cooking equipment of any suitable size.

One of the principal causes of customer dissatisfaction in restaurants where food is cooked in proximity to the customer is that where many foods must be cooked in rapid sequence in a limited space grease often drips on to the equipment and the supporting surfaces and can not be removed immediately. Moreover, cleaning of the supporting surfaces is difficult. The equipment is hot, and the collected grease generates disagreeable odors, all of which can not be drawn off by existing facilities. Not infrequently the grease ignites and rapid quenching of the fire is difficult. This constitutes a further and serious objection to the existing facilities.

The present invention contemplates supporting means which enable all of the grease drippings to drain off the cooking equipment and drop directly in one of a plurality of drip pans in which the drippings can accumulate. The supporting means cannot accumulate substantial amounts of grease and, additionally, are accessible for cleaning without removing the cooking equipment from the unit. The drip pans are below the cooking equipment and are out of the range of the intense cooking heat, so that fires and the generation of offending odors is minimized. The odors that are generated can be drawn off through existing vents. A hinged door, having a neat exterior appearance harmonizing with the rest of the exterior structure of the unit, conceals each drip pan to prevent the drip pans from detracting from the appearance of the unit. The hinged doors may be readily swung open to expose the ends of the drip pans so that they may be removed from the unit for emptying, cleaning, or for any other purpose.

The structure by which the above and other advantages of the invention are attained will be described in the following specification, taken in conjunction with the accompanying drawings illustrating a preferred structural embodiment of the invention, in which:

Fig. 1 is a perspective view of a food service equipment unit embodying the invention;

Fig. 2 is a fragmentary perspective view of the drip pan and associated structure, with parts broken away to facilitate illustration;

Fig. 3 is a horizontal sectional view taken along the line 3—3 of Fig. 1;

Fig. 4 is a cross sectional view, taken along the line 4—4 of Fig. 3;

Fig. 5 is a cross sectional view, taken along the line 5—5 of Fig. 3;

Fig. 6 is a fragmentary sectional view showing the drip pan partially withdrawn; and Fig. 7 is a fragmentary perspective view of one of the base supporting rails with one end about to be engaged with the front track on which it is mounted.

Referring to the drawings, the food service equipment unit comprises a back wall 2 from the opposite ends of which side walls 3 and 4 project. Side walls 3 and 4 are each of tubular structure, as shown in Fig. 2, and are each preferably welded to the back wall to form a self-sustaining structure that stands by itself and does not have to be secured to the kitchen wall. This arrangement is particularly advantageous in that it permits the unit to be moved around at will.

Adjacent the upper edge of the unit a shelf 5 extends forwardly of the back wall 2 between side walls 3 and 4 to provide storage space for dishes, or cooking utensils, for example. A vent, not shown, is provided in the back wall adjacent the shelf 5 to provide for exhaust of the hot products of combustion. The side walls of the unit increase in width adjacent shelf 5, as indicated at 6, Fig. 1, and increase again just above the level of the cooking equipment, as indicated at 7. A pair of brackets 8 secured respectively to the front edges 9 and 10 of side walls 3 and 4 support a removable cutting board 11. The rear edge of cutting board 11 terminates forwardly of front edges 9 and 10 to provide ample access to the cooking equipment and to any food or utensils that may be placed on the cooking equipment. The removability of the cutting board facilitates cleaning of the unit.

A front wall 12 extends over the lowermost portion of the unit between front edges 9 and 10 of the side walls and is cut away to provide openings into which drawers 13 are slidably fitted. The drawers 13 provide convenient storage space for cooking utensils. A partition wall 14, parallel to side walls 3 and 4, extends between back wall 2 and front wall 12 above the top edge of the front wall. The space between end wall 3, partition wall 14, back wall 2 and front wall 12 is provided with a horizontal wall 15 which covers the top of this portion of the storage space behind front wall 12 and also provides additional storage space for dishes or cooking utensils.

An angle iron 16 is secured at its opposite ends to side wall 3 and partition 14 adjacent the front edge 9.

A track 17, rigidly secured to angle iron 16, as by welding, extends across the length of angle iron 16, and has a horizontal flange 18 extending rearwardly from the angle iron. The flange 18 is provided with a plurality of laterally aligned equally spaced apertures 19. The inner edge of flange 18 is bent downwardly, as indicated at 20, to provide added rigidity for the flange 18. A track 21, adjacent the rear wall 2 and extending parallel to track 17, has one wall 22 welded to back wall 2, a forwardly extending horizontal flange 23 similar to flange 18 and provided with apertures 24 spaced apart the same distance as apertures 19, and a downwardly extending flange 25 similar to flange 20.

A plurality of base supporting rails 26 have their opposite ends mounted on tracks 17 and 21. Each base supporting rail comprises an angle iron 27 to which a strip 28 is welded. One edge of strip 28 is bent upwardly to form a flange 29 that serves as an abutment for the side of the burner or other cooking equipment mounted on the pair of rails. The opposite edge of the rail is bent downwardly to form another flange 30 which terminates in the same plane as the downwardly extending leg of angle iron 27, so that the rail 26 may rest evenly on the tracks 17 and 21. A pin 31 extends downwardly from strip 28 adjacent each end thereof. Pins 31 are slightly longer than flange 30 so they can project into the apertures 19 of track 17 and the corresponding apertures 24 of track 21.

Adjacent rails 26 are oppositely disposed to form pairs with the upstanding flanges 29 on the outer edges of the rails of each pair. Each pair of rails is adapted to support any size burner or other cooking equipment. Only limited portions of the cooking equipment adjacent the side edges thereof are in contact with the rails and most of the space immediately below the cooking equipment is open to permit grease from the equipment to fall through the space to underlying drip pans. The rails may be raised to clear the pins 31 and freely moved to any desired lateral position to properly support the equipment mounted thereon.

A channel 32 is welded to side wall 3 slightly below the level of the tracks 17 and 21. A similar channel 33 is welded to partition 14 in parallel relationship to channel 32. The flanges of these channels extend towards each other. A pair of channels 34 and 35 in back to back relationship are arranged parallel to channels 32 and 33 and are welded at their ends to tracks 17 and 21. The flanges of channel 32 and 34 extend towards each other and cooperate to support a drip pan 36 therebetween. The flanges of channels 33 and 35 likewise cooperate to support a drip pan 37. The drip pans are positioned directly under the burners or other cooking equipment and cover the entire area between side wall 3 and partition 14 so that they catch all the grease that may drip from the burners, cooking equipment or walls of the unit. If desired, apertures may be provided in flanges 28 to facilitate drainage of grease therefrom. The drip pans are slidable in the channels so that they may be easily removed therefrom for cleaning. Both drip pans are normally concealed by a single closure or door 38, hinged to the edge of track 17, as indicated at 39.

The space between partition 14 and side wall 4 is provided with a track 40, similar to track 17, adjacent its front edge, and a track 41, similar to track 21, adjacent its rear edge. The tracks 40 and 41 are in the same plane which is below the plane of tracks 17 and 21, and one or more pairs of base supporting rails 42, similar to rails 26, are mounted on the tracks 40 and 41 to support one or more deep fat fryer assemblies. A pair of channels 43, similar to channels 32 and 33, are welded to partition 14 and side wall 4 slightly below tracks 40 and 41 to slidably support a drip pan 44. A door 45, similar to door 38, hinged to track 40, as indicated at 46, conceals drip pan 44. The closures 38 and 45 are provided on their front surfaces with the same finish as the front surface of the unit to provide a neat, attractive appearance.

It will be obvious that the space between side walls 3 and 4 may be divided in any desired proportion so that the burners or other cooking equipment may be arranged in any desired manner. It is also possible to omit the partition 14 and have the entire area between the side walls occupied by cooking equipment of uniform height.

Although we have described a preferred embodiment of our invention in considerable detail, it will be understood that the description thereof is intended to be illustrative, rather than restrictive, as many structural features may be modified or changed without departing from the spirit or scope of our invention. Accordingly, we do not desire to be restricted to the exact structure described, except as limited by the appended claim.

We claim:

In a food service equipment unit, a back wall, a pair of walls extending forwardly from said back wall, a pair of spaced tracks extending between said pair of walls, one of said tracks being adjacent said back wall and the other being adjacent the front edges of said pair of walls, a plurality of pairs of base supporting rails mounted on said tracks, interengageable means on said base supporting rails and tracks to hold said base supporting rails against accidental displacement from selective laterally spaced relationship, each of said pairs of base supporting rails being adapted to support an item of cooking equipment thereon, a drip pan means supported under said tracks, said drip pan means extending under a plurality of said pairs of rails, and a single closure hinged to said second mentioned track, said closure being swingable into position to conceal said drip pan means.

References Cited in the file of this patent

UNITED STATES PATENTS

| | | |
|---|---|---|
| 1,340,615 | Lawa | May 18, 1920 |
| 1,676,603 | Dick | July 10, 1928 |
| 1,734,466 | Hoke | Nov. 5, 1929 |
| 1,930,663 | Rogers | Oct. 17, 1933 |
| 2,367,626 | Shroyer et al. | Jan. 16, 1945 |
| 2,409,528 | Baunach | Oct. 15, 1946 |
| 2,443,871 | Shield | June 22, 1948 |
| 2,445,124 | Reeves | July 13, 1948 |

FOREIGN PATENTS

| | | |
|---|---|---|
| 199,397 | Switzerland | Nov. 1, 1938 |